(12) United States Patent
Tien et al.

(10) Patent No.: US 7,794,129 B2
(45) Date of Patent: Sep. 14, 2010

(54) OPTICAL ELEMENT APPARATUS FOR TWO-DIMENSIONAL CONTROLLABLE LOCALIZED PARTITION BACKLIGHT MODULE

(75) Inventors: Chung-Hao Tien, Hsinchu (TW); Yen-Hsing Lu, Hsinchu (TW); Yu-Kuo Cheng, Hsinchu (TW); Po-Yi Lu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 221 days.

(21) Appl. No.: 12/003,407

(22) Filed: Dec. 26, 2007

(65) Prior Publication Data
US 2009/0168420 A1    Jul. 2, 2009

(51) Int. Cl.
*F21V 8/00* (2006.01)
(52) U.S. Cl. .................. 362/606; 362/612; 362/620; 362/626
(58) Field of Classification Search .......... 362/606, 362/612, 626, 331, 339, 616, 620, 624
See application file for complete search history.

(56) References Cited

U.S. PATENT DOCUMENTS

| | | | | |
|---|---|---|---|---|
| 7,121,709 | B2* | 10/2006 | Shinohara et al. | 362/606 |
| 7,255,456 | B2* | 8/2007 | Yao et al. | 362/225 |
| 7,287,891 | B1* | 10/2007 | Park et al. | 362/555 |
| 7,458,714 | B2* | 12/2008 | Chang | 362/626 |
| 7,654,719 | B2* | 2/2010 | Chang | 362/606 |
| 7,654,723 | B2* | 2/2010 | Chang | 362/620 |
| 7,663,804 | B2* | 2/2010 | Chang | 359/599 |
| 2007/0086179 | A1* | 4/2007 | Chen et al. | 362/27 |
| 2007/0086211 | A1* | 4/2007 | Beeson et al. | 362/628 |
| 2007/0147073 | A1* | 6/2007 | Sakai et al. | 362/607 |

OTHER PUBLICATIONS

Conference Homepage; 2007 International Symposium, Seminar, and Exhibition, May 20-25, 2007, Long Beach Convention Center, Long Beach, California, USA.
Conference Program; 2007 International Symposium, Seminar, and Exhibition, May 20-25, 2007, Long Beach Convention Center, Long Beach, California, USA.
Lu et al., Yen-Hsing; P-69: A Localized Partition Approach for High-Dynamic-Range Display; P-69; May 20, 2007; Conference: International Symposium, Seminar and Exhibition 2007, U.S.A.

* cited by examiner

*Primary Examiner*—Stephen F. Husar
*Assistant Examiner*—Peggy A. Neils
(74) *Attorney, Agent, or Firm*—Bacon & Thomas, PLLC (57) ABSTRACT

The optical element apparatus for two-dimensional controllable localized partition backlight module is disclosed. The optical element apparatus comprises of a plurality of optical units which include a plurality of point light sources, light guides and collimating sheets. The point light source is located at the center of the light guide. The light guide includes the incident surface, the bottom place connecting with the light incident surface, and the light output surface. There are micro structures on the bottom place of the light guide and the top surface of the collimating sheet.

3 Claims, 9 Drawing Sheets

OPTICAL ELEMENT APPARATUS FOR TWO-DIMENSIONAL CONTROLLABLE LOCALIZED PARTITION BACKLIGHT MODULE

BACKGROUND OF THE INVENTION

1. Field of the Invention

The invention relates to an optical element apparatus of backlight module for the liquid crystal display, particularly to an optical element apparatus for two-dimensional controllable localized partition backlight module.

2. Description of the Prior Art

The backlight module is generally one of key components of a liquid crystal display, since the liquid crystal itself has no not luminance; thus the function of the backlight module can supply sufficient luminance and even distribution light source, in order to enable the liquid crystal display to show the image normally.

As for the conventional backlight technology specified in "A High Dynamic Range Display Using Low and High Resolution Modulators", SID 2003 Conference Proceedings (2003), a low resolution backlight module is used to combine a high resolution LCD panel to obtain the effect of high dynamic range display, reduce the dark state of conventional LCD, and raise the contract ratio. But the combination of the module is very complicated; the practical use is not highly increased.

In the research literature of "High Dynamic Range Display System", ACM SIGGRAPH 2004 Conference Proceedings, two practical examples for low resolution backlight module and related corresponding algorithms are proposed. A projector is used as the backlight source of the relative low resolution. Although the effect is very good, the required volume space is very large, thus it is not competitive for practical application. Since an active light emitting diode (LED) matrix is used as the backlight source of low resolution, the optical field of each LED can not form the mutual independent regional field. Each LED field covers all operation areas of high resolution LCD panel, increasing the complexity of a convolution operation in accordance with the proposed algorithm. And it will consume time and hardware resource for the treatment of real time image signal, thus it will be limited for the practical application in the industry.

In addition, in the literature of "Deriving LED Driving Signal for Area-Adaptive LED Backlight in High Dynamic Range LCD Displays", SID 2007 Conference Proceedings (2007), two algorithms are proposed to simplify the complexity of the original algorithm, but the optical method is not proposed to improve the complexity of the algorithm.

Figure 1:
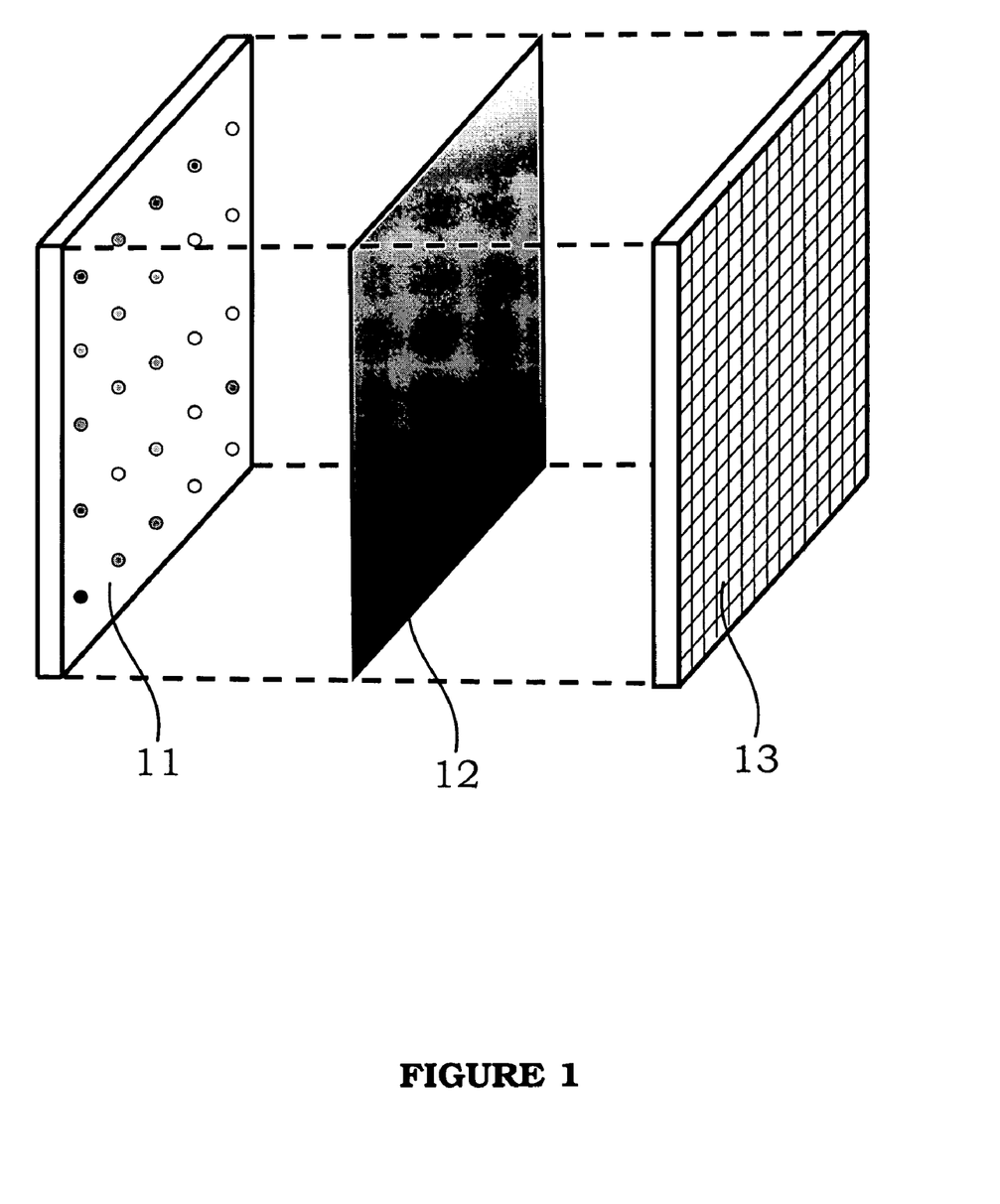
FIG. 1 is the diagram schematically illustrating the prior art.

Upon summarizing the above-mentioned description, as shown in FIG. 1, the conventional backlight module 10 composed of optical element 11, light field distribution pattern 12 and LCD panel 13, which will cause uneven and distribution light source.

Corresponding with the promotion of the manufacturing technology of liquid crystal display, only the backlight module with light weight, thin shape, low power consumption, high illumination, and low cost can meet the requirement of market. It will be the diligent direction and important subject to develop and design the new-type backlight module and manufacturing technology in the future.

SUMMARY OF THE INVENTION

The invention discloses an optical element apparatus for a two-dimensional controllable localized partition backlight module. The backlight module can provide a low revolution light pattern, to simplify the convolution operation of high dynamic contrast image signal, and reach the purpose of raising the dynamic range of LCD displays.

The invention uses a plurality of point light sources to combine with the light guide and the collimating sheet having a plurality of micro structures, to control the light field distribution and dispersion angle of output light, so that each point light source can generate an independent light field, which will not overlap the light field generated by any other point light source.

The invention relates to an optical element apparatus of backlight module for the liquid crystal display, comprising:

The light guide comprises a plurality of light guide devices which include a plurality of point light source, a central hole, a light incident surface of the light guide, a light output surface of the light guide and a bottom place of the light guide plate. The point light source is located at the center of the light guide. There are micro structures on the bottom place of the light guide.

The collimating sheet includes a plurality of the collimating units. There is a plurality of micro structures on the light output surface of the collimating unit. The collimating sheet is connected to the optical unit to form an optical element apparatus for two-dimensional controllable localized partition backlight module.

By the designed optical element apparatus for the two-dimensional controllable localized partition backlight module of the invention, wherein a plurality of optical units can provide low resolution light field distribution without mutual interference. When high resolution LCD panel is used together, the treatment complexity for the convolution operation of high dynamic contrast image can be greatly simplified.

The optical element apparatus for two-dimensional controllable localized partition backlight module disclosed of the invention can provide a low revolution light pattern, to simplify the convolution operation of high dynamic contrast image signal, and reach the purpose of raising the dynamic range of LCD displays.

Therefore, the foregoing and other advantages and features of the invention will become more apparent from the detailed description of the preferred embodiments of the invention given below with reference to the accompanying drawings.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The invention will be understood sufficiently by the description of the following embodiment, and those skilled in the art can finish it accordingly. But the enforcement of this invention shall not limited by the following embodiment.

Figure 2:
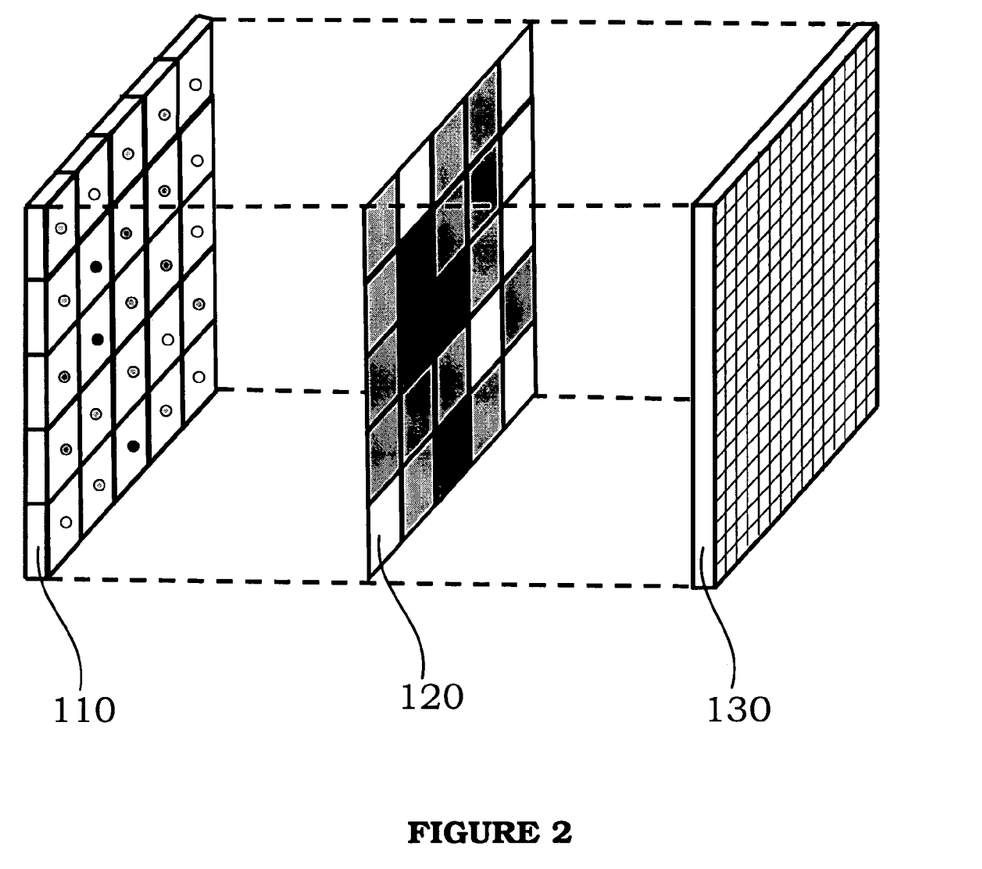
FIG. 2 is the diagram schematically illustrating the first embodiment of the invention.
Figure 3A:
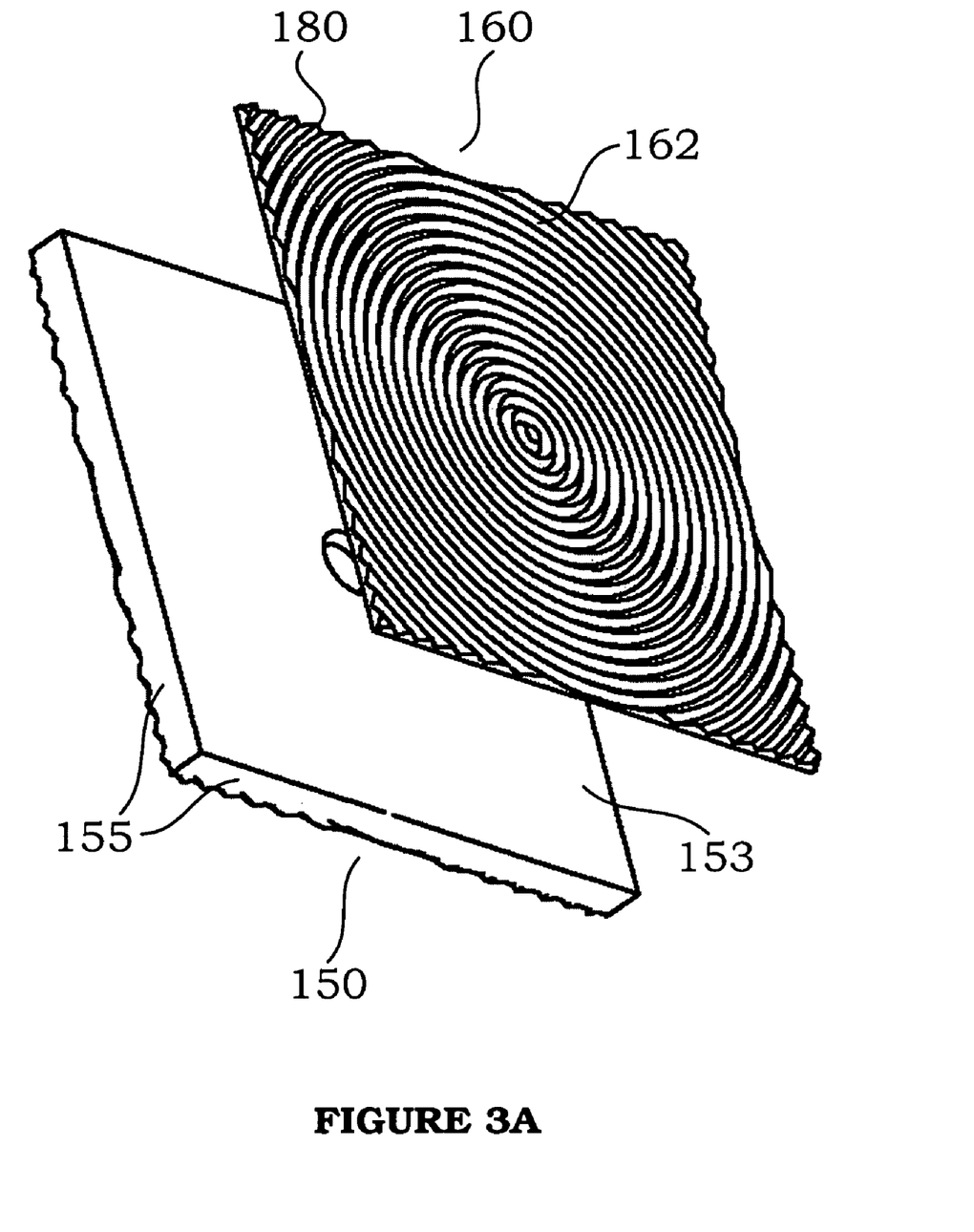
FIG. 3A is the stereo view schematically illustrating the first embodiment of the invention.

The invention for the optical element apparatus for a two-dimensional controllable localized partition backlight module is described in detail as follows:

FIG. 2 shows the first embodiment of the invention. The backlight module 100 is composed of optical units 110 formed as a matrix shape, which can project the corresponding low resolution and independent light field distribution pattern 120, and connect with LCD panel 130. The optical unit 110 comprises a plurality of point light sources, light guides and collimating sheets, which is described in detail as follows:

As shown in FIG. 3A, the stereo magnification of optical unit 110 is schematically illustrated by every individual optical element. There is a plurality of micro structures 180 on the second light output surface 162 of the collimating sheet 160. The light guide 150 comprises the first light output surface of light guide 153 and the edge of light guide 155.

Figure 3B:
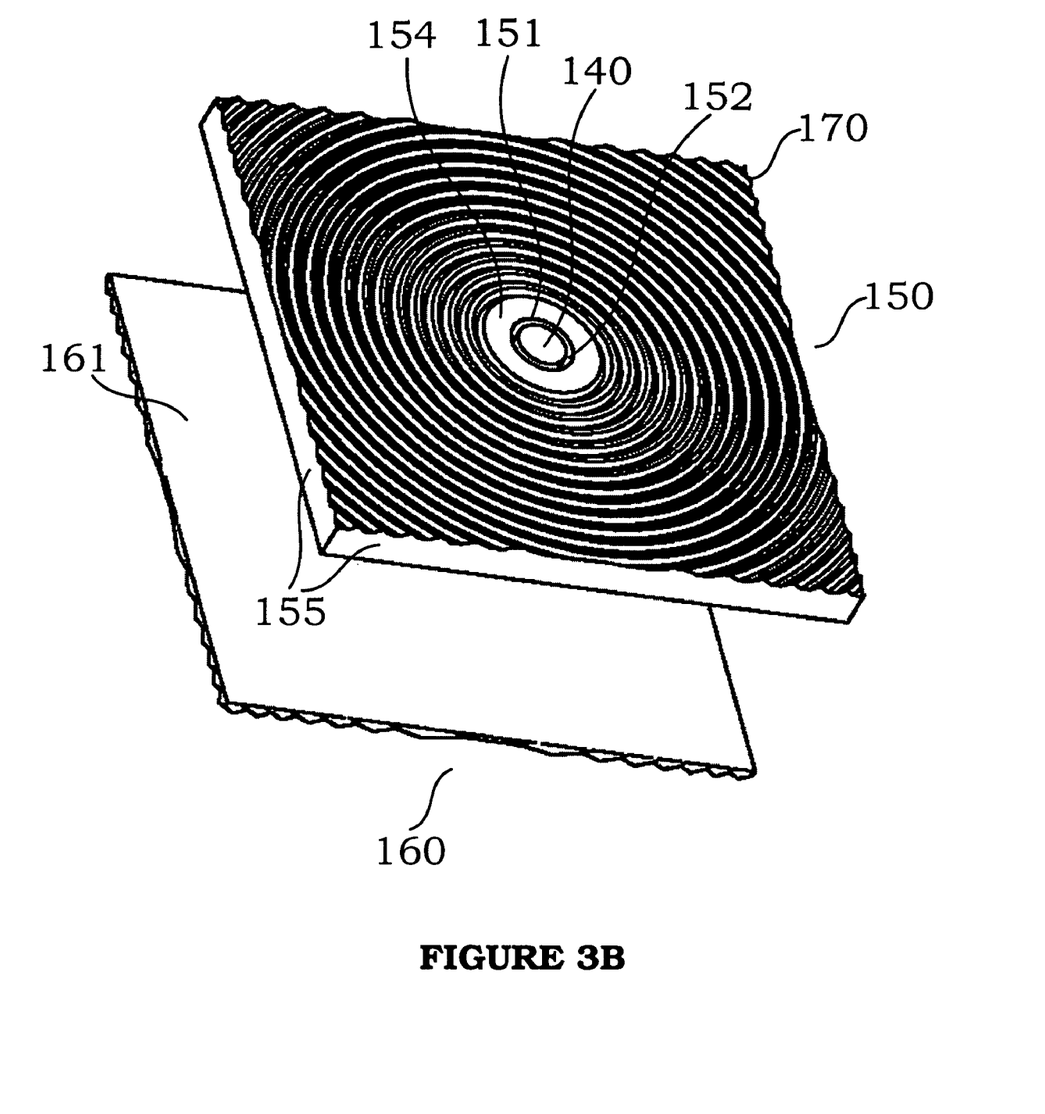
FIG. 3B is the stereo view schematically illustrating the first embodiment of the invention.

Again, as shown in FIG. 3B, the stereo magnification of the light guide 150 comprises a point light source 140, central hole 151, and the point light source 140 is located at the central hole 151. The first light incident surface of light guide 152 around central hole 151, and the edge of light guide 155. The contour of light guide 150 is a square in this embodiment, but the contour may be the polygon such as rectangle, hexagon etc. There is a plurality of micro structures 170 on the bottom surface of light guide 154 (opposite to the first light output surface of light guide 153). The plurality of micro structures 170 may be concave, convex curve, or polyhedral structure, their depth, size and gap are variable, and the pattern direction for the microstructures 170 may be the light-axle symmetry direction or the light-axle asymmetry direction. In the first embodiment, it is a plurality of annular concave rhombic structure. As the pattern direction for the micro structures 180 shown, the pattern direction is the light-axle symmetry direction around the point light source 140, which is the centre and the height and size are increased by the distance increased to the point light source 140 is increased. Thus, the gap of micro structures 170 is not equivalent with respect to the point light source 140. The collimating sheet 160 owns the second light incident surface of light guide 161.

Figure 4A:
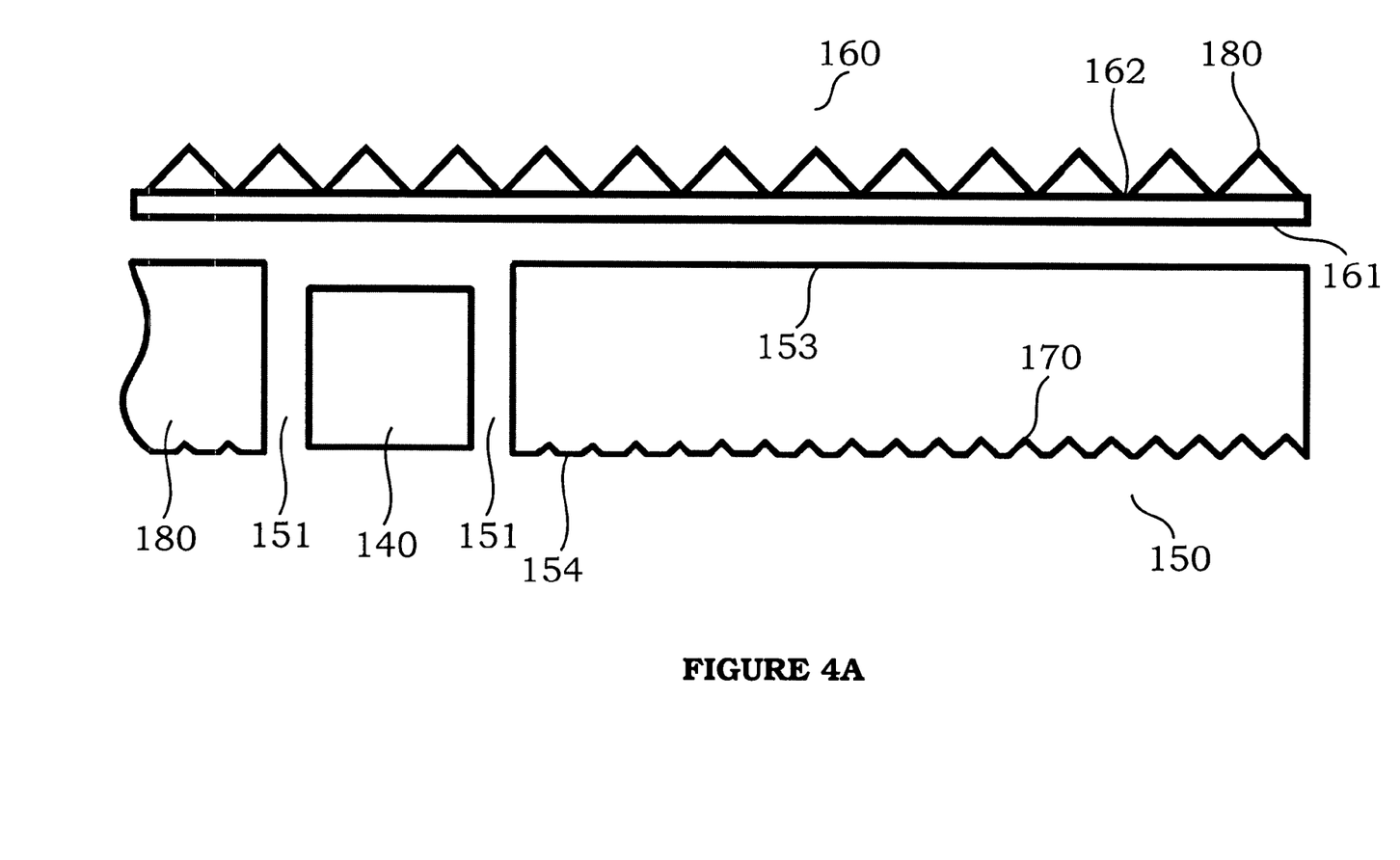
FIG. 4A is the cross-sectional view schematically illustrating the first embodiment of the invention.

FIG. 4A is the diagram schematically illustrating the cross-section view of the optical unit. The collimating sheet 160 comprises of the second light incident surface of light guide 161 and the second light output surface of light guide 162, which locates at the top of light guide 150. In the first embodiment, the contour of collimating sheet 160 is a square based on the contour of light guide 150. There is a plurality of micro structures 180 on the second light output surface of light guide 162. The plurality of micro structures 180 may be concave, convex curve, or polyhedral structure, their depth, size and gap are variable, and the pattern direction for the micro structures 180 is the light-axle symmetry direction. In the first embodiment, it is a plurality of annular convex rhombic structure, the height and size are fixed, and the pattern direction for the micro structures 180 is the light-axle symmetry direction around the point light source 140 being the centre. The shape, arrangement, height, and gap of micro structure 180 can be adjusted in accordance with the final setup by different parameters of light field distribution pattern 120. When the incident light dispersed from the point light source 140 contacts the bottom place of light guide 154, the shape, height, gap and arrangement of micro structure of light guide 170 will influence the incident angle on the surface of micro structure of light guide 170. The output light passes through the plurality of micro structures 180 on the second output surface of light guide 162, thus the shape, height, gap and pattern direction of micro structure 180 will also influence the incident angle on the surface of micro structure 180. According to the above-mentioned parameter the output light leave the first light output surface of light guide 153 at a specific range of angle, and irradiate to the second light incident surface of light guide 161, the output light can be controlled at the normal line direction of collimating sheet by through two times of refraction, in order to reach the light collecting effect. The light field distribution pattern will be the same as the shape of optical unit 110 as a square with highly uniformity.

Figure 4B:
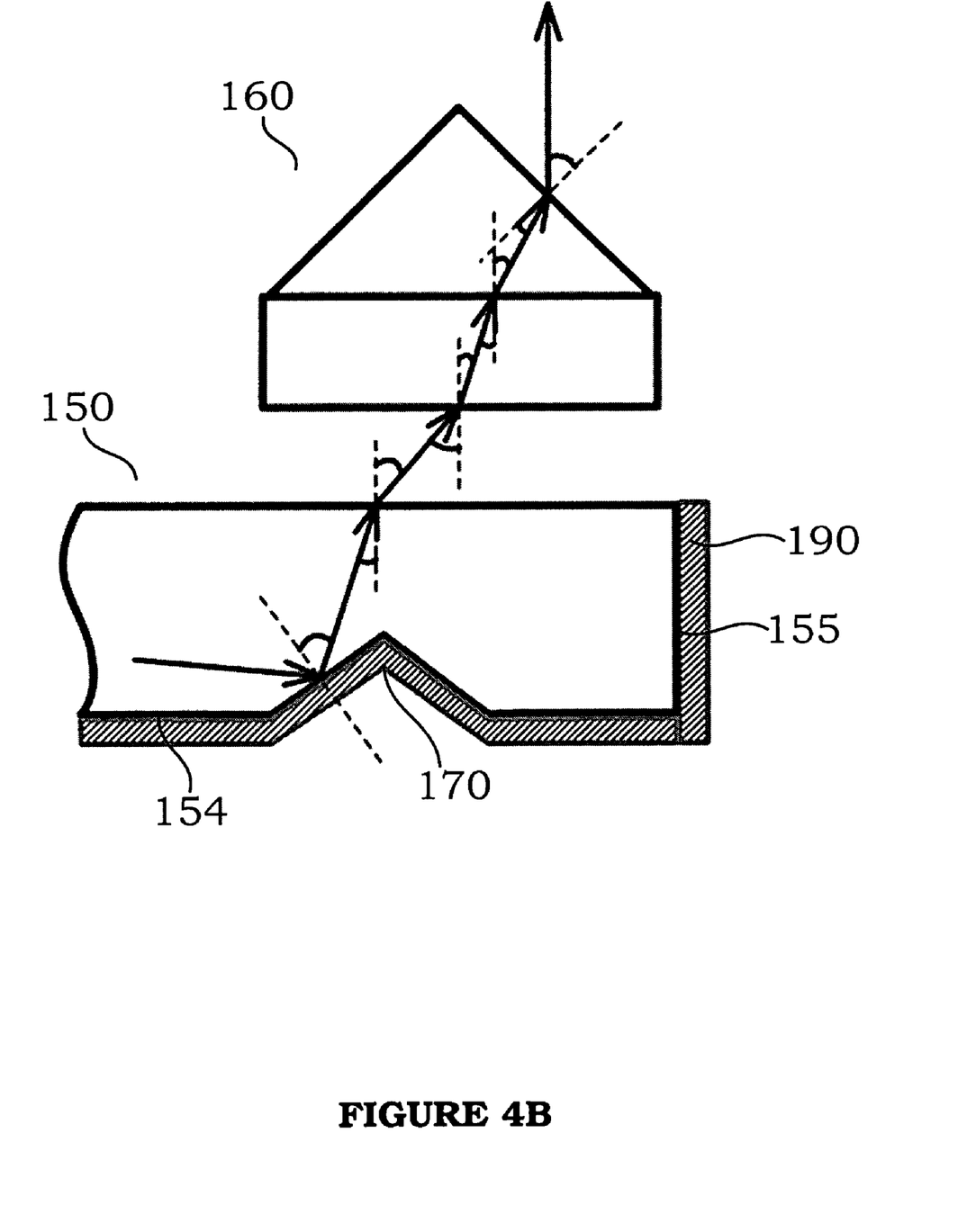
FIG. 4B is the magnified cross-sectional view schematically illustrating the first embodiment of the invention.

FIG. 4B is the magnified diagram schematically illustrating the cross-section view of the optical unit. The normal line direction of light guide 150 and collimating sheet 160 by through two times of refraction is shown in the Figure. A layer of reflective material 190, such as aluminum is coated on the plurality of micro structures 170 on the bottom place of light guide 154 and the edge of light guide 155, in order to raise the optical utilization efficiency.

Figure 5:
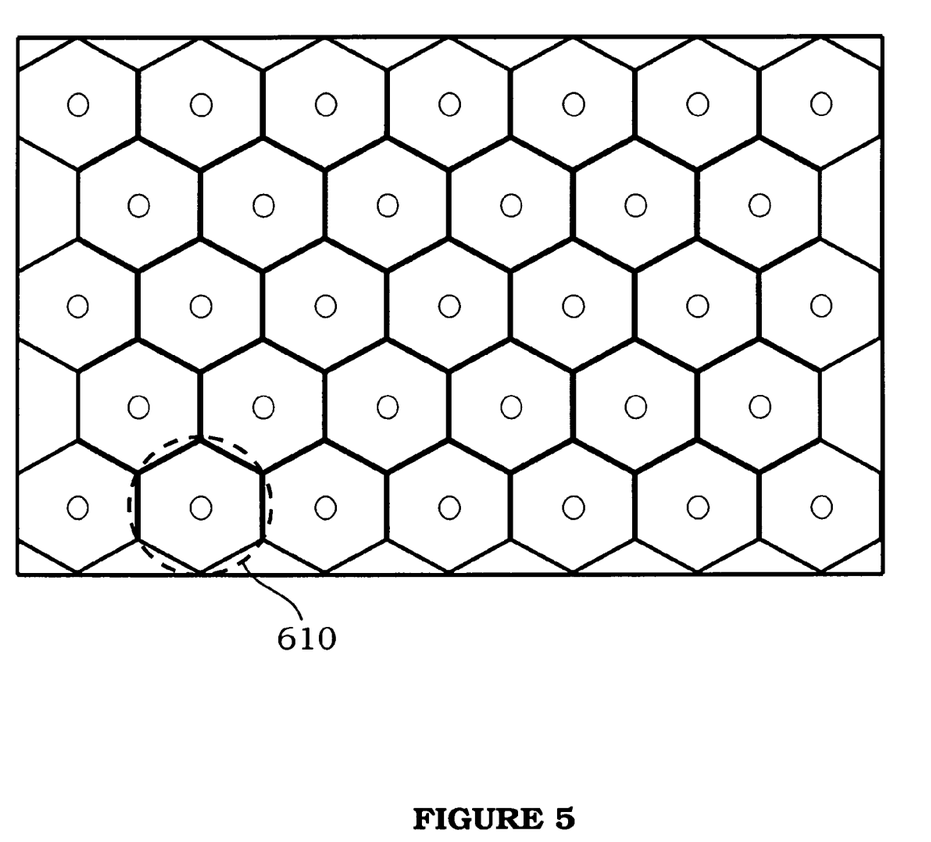
FIG. 5 is the diagram schematically illustrating the second embodiment of the invention.

FIG. 5 is the diagram schematically illustrating the top view for the backlight module of the second embodiment. The shape is different from the first embodiment. In the embodiment, the contour of optical unit 610 is hexagonal.

Figure 6A:
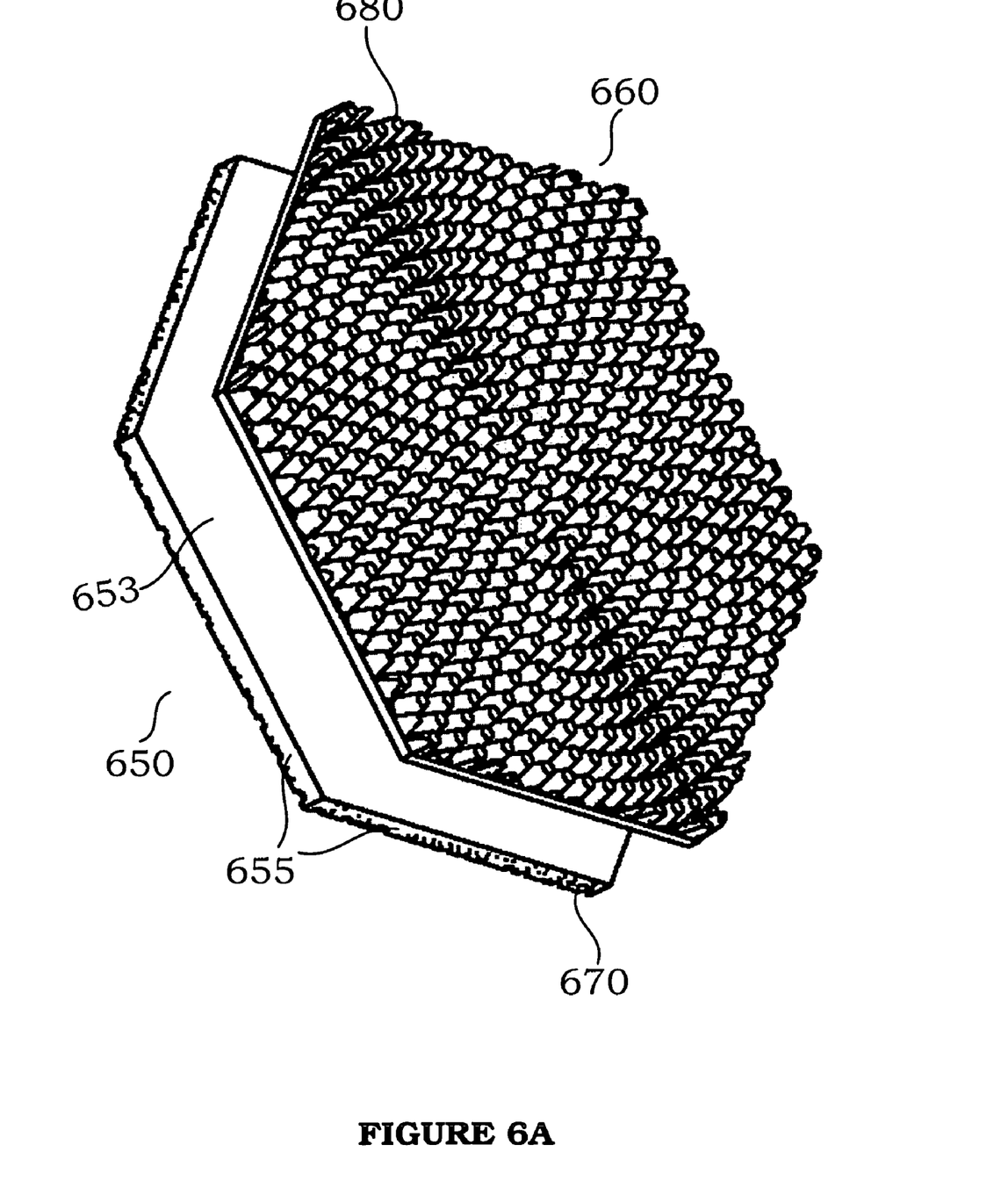
FIG. 6A is the stereo view schematically illustrating the second embodiment of the invention.

FIG. 6A is the diagram schematically illustrating the second embodiment, including the stereo diagram and cross-sectional diagram of optical unit. The major structure includes the light guide 650 and the collimating sheet 660. The light guide 650 comprises of the first light output surface of light guide 653 and the edge of light guide 655. It is different from the first embodiment in the concave curve of micro structure of light guide 670 and the pattern direction for the micro structures of light guide 670 is the light-axle asymmetrical direction. In the embodiment, the contour of light guide 650 is hexagonal. The collimating sheet 660 includes micro structure of the collimating sheet 680, which is the convex cone shape, and formed as the light axle symmetrical arrangement around the central point.

Figure 6B:
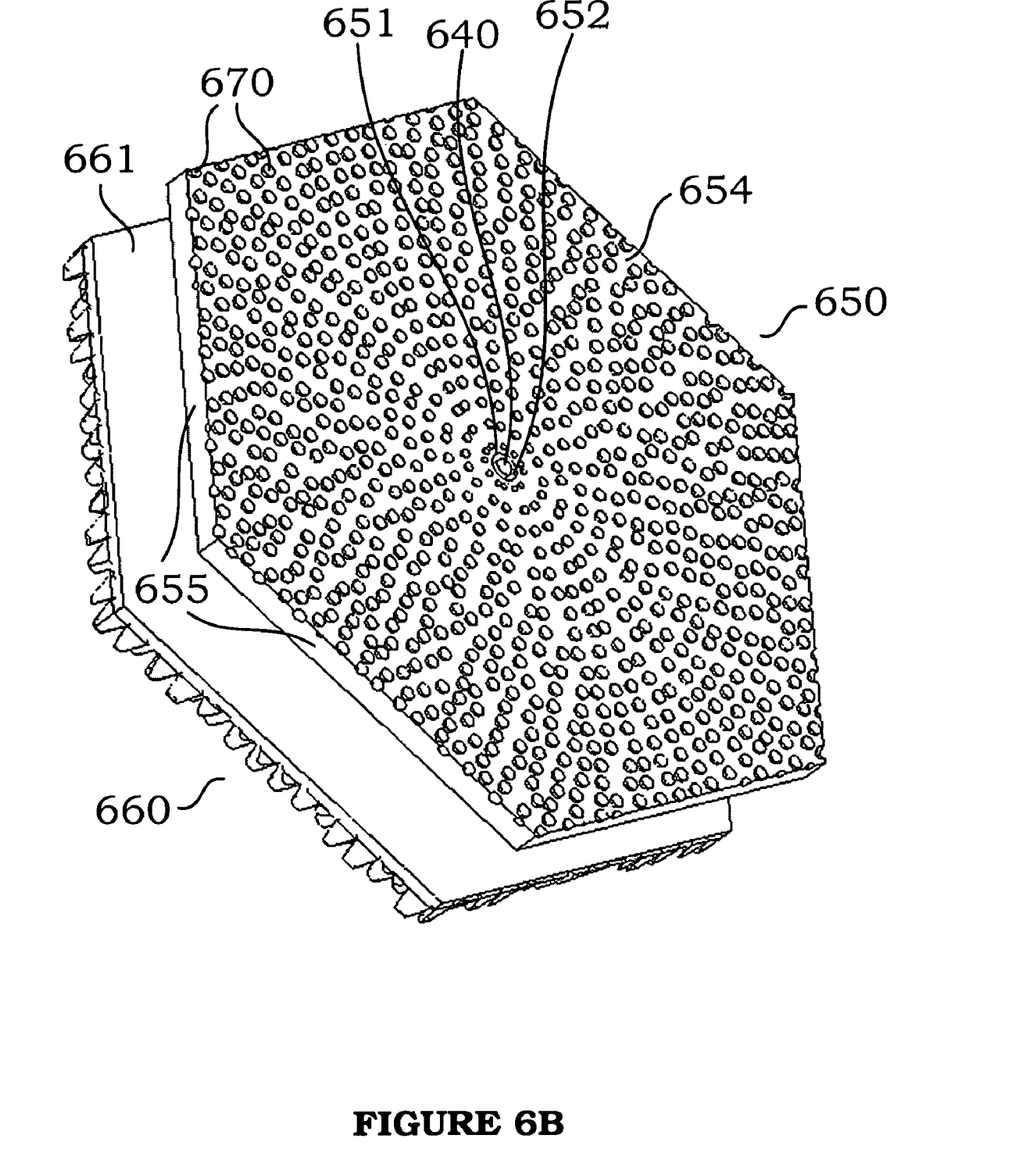
FIG. 6B is the stereo view schematically illustrating the second embodiment of the invention.

Again, as shown in FIG. 6B, the light guide 650 includes point light source 640, which is located at central hole 651. The light guide 650 includes central hole 651, the first light incident surface 652 around central hole 651, the corresponding bottom place 654, and the edge of light guide 655. There is a plurality of micro structures 670 on the bottom place of light guide 654. The plurality of micro structures 670 may be concave, convex curve, or polyhedral structure, their depth, size and gap are variable, and the pattern direction for the micro structures of light guide 670 may be the light-axle symmetry direction or the light-axle asymmetry direction. The collimating sheet 660 owns the second light incident surface 661.

The apparatus of this invention has the light collecting function, and the light output light field pattern will be the same as the contour of optical unit, which will form as an independent and highly uniform light field and will not overlap with the output light field of adjacent light guide.

It is understood that various other modifications will be apparent to and can be readily made by those skilled in the art without departing from the scope and spirit of this invention.

Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A two-dimensional controllable localized partition backlight module optical element apparatus having a light-collecting function and an output-light-field-pattern being the same with the contour of the optical unit, comprising:

a light guide having a metal reflective layer thereon, the light guide comprising:

a plurality of optical units, comprising:

a point light source;

a central hole;

a first light incident surface of the light guide around the central hole; and a first light output surface of light guide with an edge and a bottom surface of the light guide, wherein the bottom surface of the light guide has a plurality of light guide micro structures, the plurality of light guide micro structures being selected from the group consisting of a concave curve structure, a convex curve structure and a polygonal structure, and a first pattern direction of the light output surface micro structures being selected from the group consisting of a light-shaft symmetry direction and a light-shaft asymmetry direction, the point light source being located at the central hole of the optical unit; and a collimating sheet having a square contour based on a contour of the light guide and the collimating sheet being located at a top of the light guide, comprising:

a second light incident surface of the light guide; and a second light output surface of the light guide having a plurality of the second light output surface micro structures being selected from the group consisting of a concave curve structure, a convex curve structure and a polyhedral structure on the second light output surface of the light guide, a second pattern direction of the second light output surface micro structures being selected from the group consisting of a light-shaft symmetry direction and a light-shaft asymmetry direction around the point light source being the center, so that when an output light leaving the first light output surface of the light guide at a specific angle, and irradiating to the second light incident surface of the light guide, an output light being controlled at a normal line direction of the collimating sheet by through two times of refraction, on order to reach a light collecting effect, therefore the collimating sheet is connected to the optical unit to form the two-dimensional controllable localized partition backlight module optical element apparatus.

2. The apparatus according to claim 1, wherein a shape of the light guide is selected from the group consisting of a square shape, a hexagon shape and a polygon shape.

3. The apparatus according to claim 1, wherein the metal reflective layer comprises aluminum.

* * * * *